United States Patent [19]
Perry

[11] 3,918,791
[45] Nov. 11, 1975

[54] FLAT FIELD VARIABLE POWER RIFLE SCOPE

[75] Inventor: Donald M. Perry, Gresham, Oreg.

[73] Assignee: Leupold & Stevens, Inc., Beaverton, Oreg.

[22] Filed: Oct. 18, 1974

[21] Appl. No.: 516,004

[52] U.S. Cl. .................. 350/42; 350/45; 350/54
[51] Int. Cl.² ........................................ C02B 7/10
[58] Field of Search ............ 350/40, 42, 45, 54, 10; 356/247; 33/246, 297, 298

[56] References Cited
UNITED STATES PATENTS
3,045,545 7/1962 Korones et al. ............... 350/42 X
3,121,134 2/1964 Heinzel ........................ 350/42 X

*Primary Examiner*—Siegfried H. Grimm
*Attorney, Agent, or Firm*—Klarquist, Sparkman, Campbell, Leigh, Hall & Whinston

[57] ABSTRACT

A highly corrected anastigmat erector lens group is moved linearly to vary magnification and a field lens working in the virtual image range is moved non-linearly for focus compensation.

10 Claims, 5 Drawing Figures

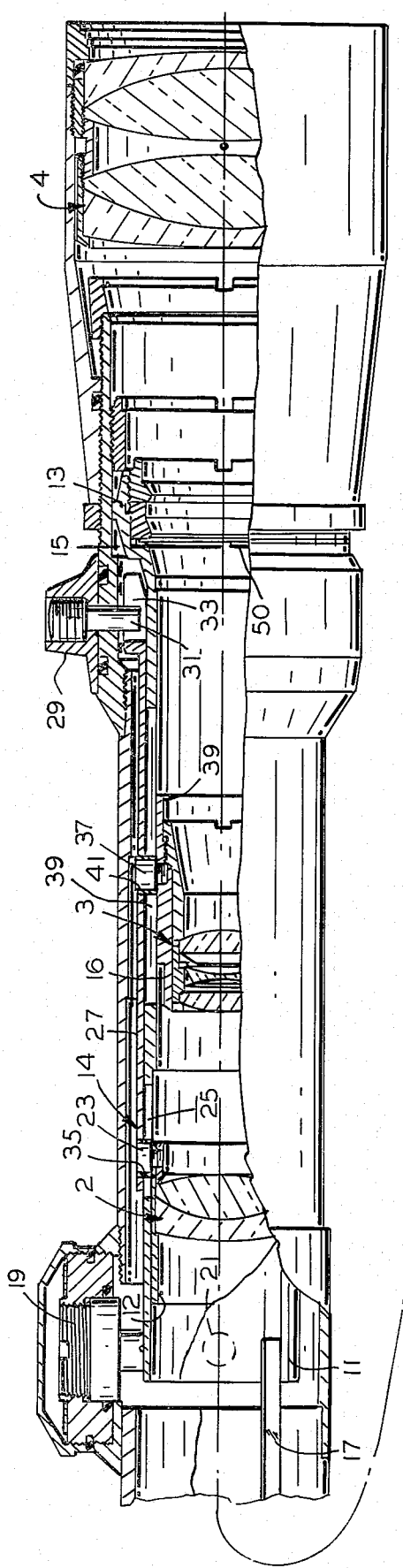
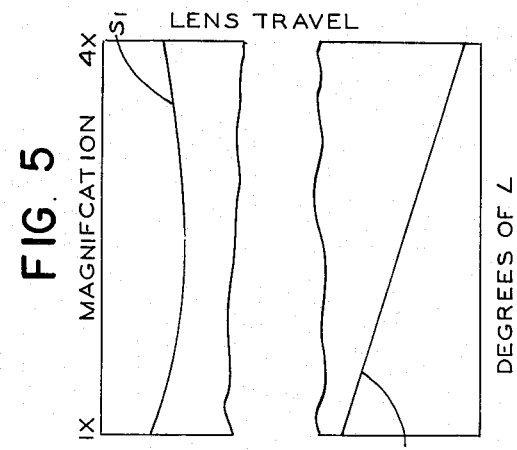
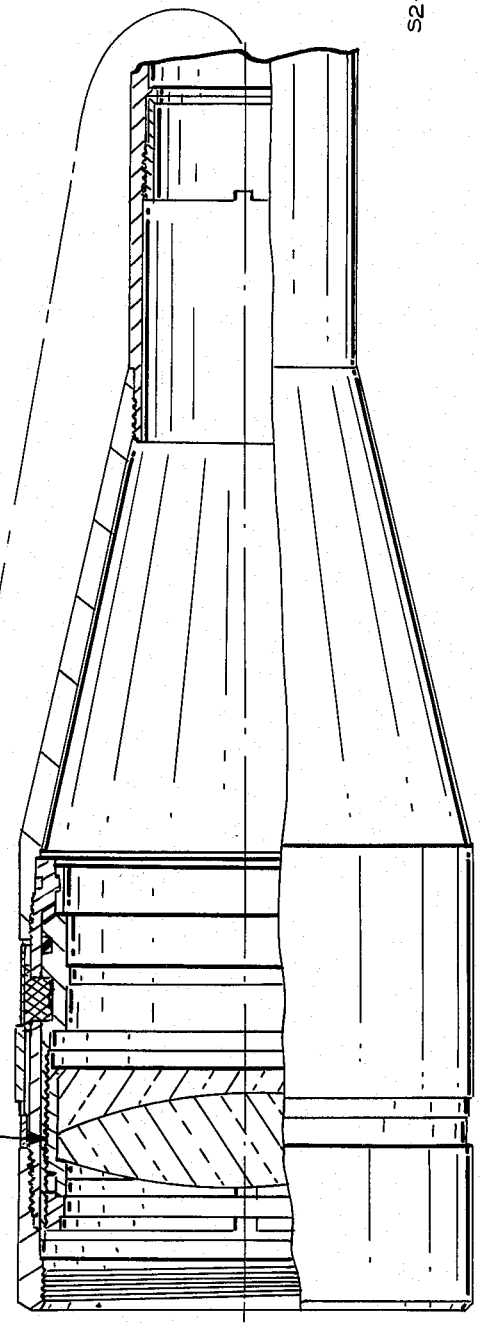

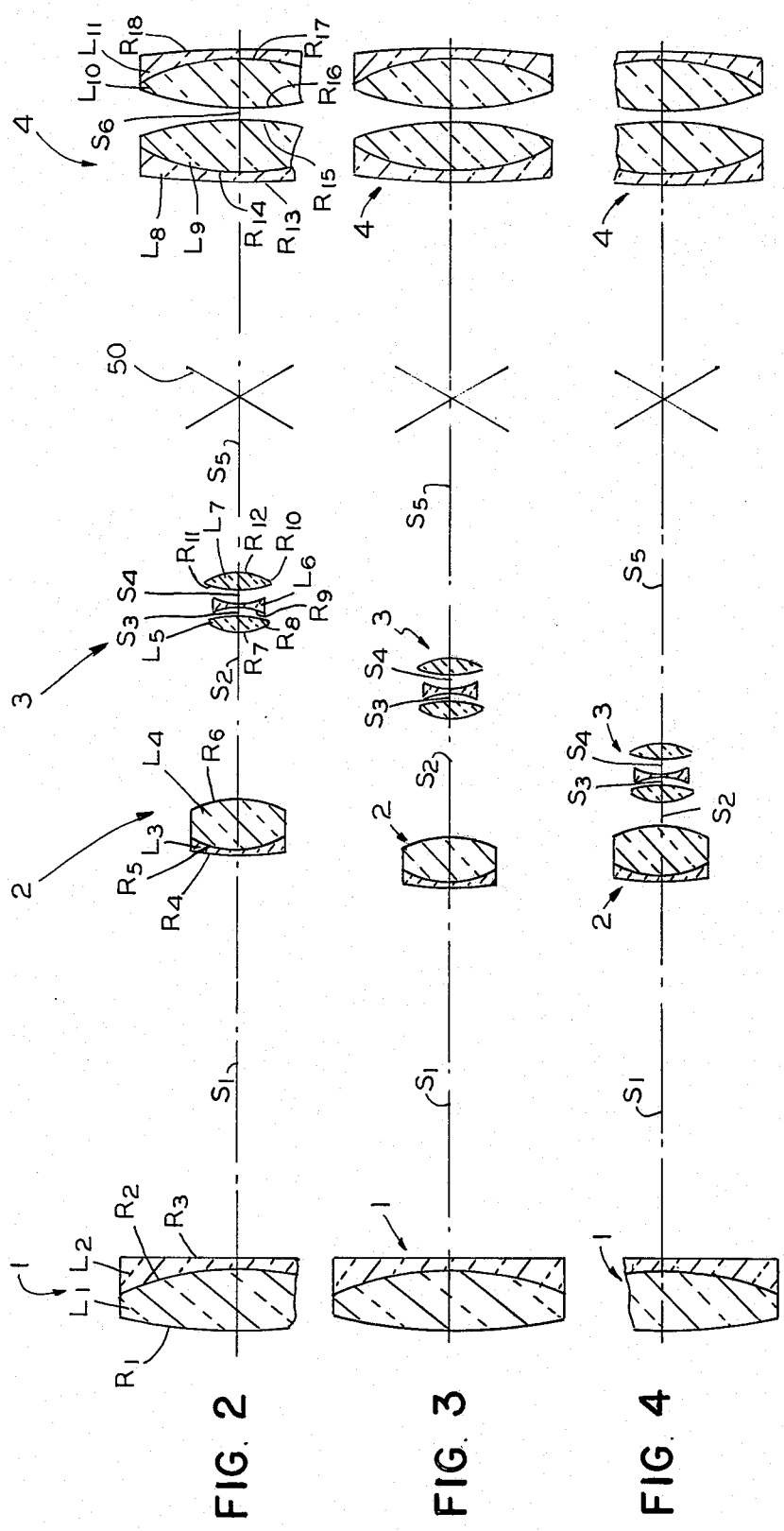

FLAT FIELD VARIABLE POWER RIFLE SCOPE

DESCRIPTION

This invention relates to a flat field variable power rifle scope, and has for an object thereof the provision of a flat field variable power rifle scope.

Another object of the invention is to provide a variable power rifle scope in which an anastigmat erector lens group is moved linearly to vary magnification and a field lens working entirely in the virtual image range is moved non-linearly to provide focus compensation.

Another object of the invention is to provide a flat field variable power rifle scope having a simple, highly corrected anastigmat erector lens group.

In the drawings:

FIG. 1 is a partially sectional, side elevation view of a flat field variable power rifle scope forming one embodiment of the invention;

FIGS. 2, 3 and 4 illustrate the lenses of the rifle scope of FIG. 1 in the high, median or low power adjustments thereof, and FIG. 5 is a graph showing the relative movements of the erector and the field lens.

Referring now in detail to the drawings, the rifle scope shown therein includes an objective 1, a field lens member 2, an anastigmat triplet erector lens member or group 3 and an eyepiece member 4. The lens member 1 is a cemented doublet including lenses $L_1$ and $L_2$ and is mounted in a fixed position in the forward end of tube 10. The field lens member 2 is a cemented doublet having lenses $L_3$ and $L_4$, and is held in a holder 12, which is movable non-linearly by a known manually turnable, power adjusting pin-and-slot, camming mechanism 14 to compensate for variations in focal plane position caused by linear movement of the erector member 3 by turning the camming mechanism 14. The erector member is a highly corrected anastigmat group including lenses $L_5$, $L_6$ and $L_7$ mounted in a holder 16 moved linearly by the mechanism 14. The eyepiece member 4 comprises two cemented doublets comprising lenses $L_8$, $L_9$, $L_{10}$ and $L_{11}$ mounted in eyepiece tube 18. The lenses $L_1$ to $L_{11}$ have spherical surfaces or radii of curvature $R_1$ to $R_{18}$; space axial thicknesses $t_1$ to $t_{11}$, and space axial separations $s_1$ to $s_6$.

The holders 12 and 16 are slidable along tube 11 which has a ball end 13 universally movable in a socket 15 horizontally for windage adjustment and vertically for elevation adjustment. The tube 11 is biased by a spring 17 against an elevation adjustment screw mechanism 19 and a windage adjustment screw mechanism 21. A follower pin 23 fixed to the holder is slidable along a spinning slot 25 along which the pin 23 is moved when cam sleeve 27 is rotated by a manually turnable ring 29 through a pin 31 and slot 33. A camming slot 35 of desired configuration in the sleeve 27 moves the pin 23 along the slot 25. The holder 16 has a follower pin 37 movable along a splining slot 39 by a camming slot 41 in the cam sleeve 27. A reticle 50 is mounted in the sleeve 11.

The erector lens group effects the change in magnification and is a highly corrected anastigmat. Since the erector lens group is moved as a unit there is no change in its focal length, and the correction is very good over a range of magnification from about 3½ to 1, a good, sharp image being maintained over this range. The primary correction is in the erector and, since its lenses are fixed or unsplit relative to each other, as the erector moves, its focal lens vary in positions, the moving virtual image of the field lens always compensating for this. The field lens does not need to give much correction to the system but does control distortion in the system. The erector holds the correction to a high order throughout the 3½ to 1 magnification range and gives a very flat field to the system throughout this range. Good spherical and coma corrections are achieved, and hybrid aberration (parallax type of distortion) is minimal due to the erector. The field lens is always in the virtual image range so that there is no great change in aberrations. Also, the relation of the focal lengths of the field lens and the anastigmat minimizes variations in the position of the exit pupil.

In order to obtain the high corrections and minimize primary and higher order aberrations, each of the crown lens $L_5$ and $L_7$ should have a shape factor of from about 0.38 to about 0.78, the shape factor of $L_5$ equaling $$\frac{R_8 + R_7}{R_8 - R_7}$$

and the shape factor of $L_7$ equaling $$\frac{R_{12} + R_{11}}{R_{12} - R_{11}}$$

and $L_6$ should have a shape factor of from 0 to $-0.3$, the shape factor of $L_6$ equaling $$\frac{R_{10} + R_9}{R_{10} - R_9} .$$

the sign convention being such that convex forwardly is plus and convex rearwardly is minus. A shape factor of $+0.58$ for $L_5$ and a shape factor of $-0.58$ for $L_7$ and a shape factor of $-0.1154$ for $L_6$ being preferable.

Preferably the lens $L_5$ and $L_7$ are identical and are arranged symmetrically. This minimizes tooling costs, makes assembly easy and makes production costs low. It also gives low aberrations and great stability.

A preferred example of the flat yield variable power rifle scope having a magnification range of 3½ to 1 is constructed in conformity with the following table wherein dimensions are in terms of millimeters and the refractive indices for the sodium D line and the Abbe dispersion numbers are designated as $n_d$ and V:

| | | | |
|---|---|---|---|
| $L_1$ | $R_1 = + 88.3$ | $t_1 = 10.0$ | $n_d = 1.5725$ V $= 57.4$ |
| | $R_2 = - 51.7$ | | |
| $L_2$ | $R_3 = - 530.0$ | $t_2 = 3.0$ | $n_d = 1.6170$ V $= 36.6$ |
| | $s_1 = \begin{cases} 154.3 \text{ (Low Power)} \\ 148.1 \text{ (Median Power)} \\ 151.2 \text{ (High Power)} \end{cases}$ | | |
| $L_3$ | $R_4 = + 41.6$ | $t_3 = 1.0$ | $n_d = 1.617$ V $= 36.6$ |
| | $R_5 = + 14.5$ | | |
| $L_4$ | $R_6 = - 19.4$ | $t_4 = 7.75$ | $n_d = 1.517$ V $= 64.5$ |
| | $s_2 = \begin{cases} 30.4 \text{ (Low Power)} \\ 21.5 \text{ (Median Power)} \\ 4.4 \text{ (High Power)} \end{cases}$ | | |
| $L_5$ | $R_7 = + 11.698$ | $t_5 = 2.5$ | $n_d = 1.61262$ V $= 58.8$ |

-continued

| | | | |
|---|---|---|---|
| | $R_8 = -44.01$ | | |
| $L_6$ | $R_9 = -13.87$ | $t_6 = 1.0$ | $n_d = 1.617\ V = 36.6$ |
| | $R_{10} = +11.00$ | $s_3 = 1.45$ | |
| | | $s_4 = 2.56$ | |
| $L_7$ | $R_{11} = +44.01$ | $t_7$ | $n_d = 1.61262\ V = 58.8$ |
| | $R_{12} = -11.698$ | | |
| | $s_5 = \begin{cases} 70.1\ (\text{Low Power}) \\ 84.9\ (\text{Median Power}) \\ 99.7\ (\text{High Power}) \end{cases}$ | | |
| $L_8$ | $R_{13} = +129.0$ | $t_8 = 2.0$ | $n_d = 1.617\ V = 36.6$ |
| | $R_{14} = +35.5$ | | |
| $L_9$ | | $t_9 = 9.25$ | $n_d = 1.517\ V = 64.5$ |
| | $R_{15} = -53.2$ | | |
| | $R_{16} = +62.4$ | $s_6 = 1.78$ | |
| $L_{10}$ | | $t_{10} = 8.75$ | $n_d = 1.517\ V = 64.5$ |
| | $R_{17} = -35.5$ | | |
| $L_{11}$ | | $t_{11} = 2.0$ | $n_d = 1.617\ V = 36.6$ |
| | $R_{18} = -129.0$ | | |

The eyepiece is adjustable relative to a combined reticle and diaphragm 50 with a nominal position 38.49 m.m. in front of the surface $R_{13}$.

What is claimed is:

1. In a flat field variable power rifle scope, proceeding from front to rear,
   a fixed objective,
   a focus compensating field lens member movable non-linearly,
   a power varying anastigmat erector lens group having lenses fixed relative to each other and movable as a unit,
   the erector lens group being highly corrected to provide a flat field to the system over a wide range of magnification,
   and an eyepiece.

2. The rifle scope of claim 1 wherein erector lens group is an air spaced triplet.

3. The rifle scope of claim 2 wherein the field lens member is corrected to provide distortion correction to the system.

4. The rifle scope of claim 1 wherein the erector lens group is an air spaced triplet having radii $R_7$ to $R_{12}$ and including a front positive lens, a middle negative lens and a rear positive lens,
   the front positive lens having radii $R_7$ and $R_8$ of such dimensions that $$\frac{R_8 + R_7}{R_8 - R_7}$$

is from about 0.38 to about 0.78, the middle negative lens having radii $R_9$ and $R_{10}$ of such dimensions that $$\frac{R_{10} + R_9}{R_{10} - R_9}$$

is from about 0 to −0.3, the rear positive lens having radii $R_{11}$ and $R_{12}$ of such dimensions that $$\frac{R_{12} + R_{11}}{R_{12} - R_{11}}$$

is from about −0.38 to about −0.78, the sign convention being such that convex forwardly is positive and convex rearwardly is negative.

5. The rifle scope of claim 4 wherein $$\frac{R_8 + R_7}{R_8 - R_7}$$

is about 0.58 and $$\frac{R_{12} + R_{11}}{R_{12} - R_{11}}$$

is about −0.58.

6. The rifle scope of claim 5 wherein $$\frac{R_{10} + R_9}{R_{10} - R_9}$$

is about −0.1154.

7. The rifle scope of claim 6 wherein the front and rear positive lenses are identical and are arranged symmetrically.

8. The rifle scope of claim 4 wherein the front and rear positive lenses are identical and are arranged symmetrically.

9. The rifle scope of claim 5 wherein the front and rear positive lenses are identical and are arranged symmetrically.

10. The rifle scope of claim 1 wherein the objective lens is a cemented doublet, the field lens is a cemented doublet, the erector lens group is an air spaced triplet, and the eyepiece is two cemented doublets, the scope being further characterized in being constructed in substantial compliance with the following table in which dimensions are in terms of millimeters, $R_1$ to $R_{18}$ designate the radii of curvature of the optical surfaces, $t_1$ to $t_{11}$ the axial thicknesses, $s_1$ to $s_6$ the axial separations, $n_d$ the indices of refraction for the sodium D line, and $V$ the Abbe dispersion numbers:

| | | | |
|---|---|---|---|
| $L_1$ | $R_1 = +88.3$ | $t_1 = 10.0$ | $n_d = 1.5725\ V = 57.4$ |
| | $R_2 = -51.7$ | | |
| $L_2$ | | $t_2 = 3.0$ | $n_d = 1.6170\ V = 36.6$ |
| | $R_3 = -530.0$ | | |
| | $s_1 = \begin{cases} 154.3\ (\text{Low Power}) \\ 148.1\ (\text{Median Power}) \\ 151.2\ (\text{High Power}) \end{cases}$ | | |
| $L_3$ | $R_4 = +41.6$ | $t_3 = 1.0$ | $n_d = 1.617\ V = 36.6$ |
| | $R_5 = +14.5$ | | |
| $L_4$ | | $t_4 = 7.75$ | $n_d = 1.517\ V = 64.5$ |
| | $R_6 = -19.4$ | 200 | |
| | $s_2 = \begin{cases} 30.4\ (\text{Low Power}) \\ 21.5\ (\text{Median Power}) \\ 4.4\ (\text{High Power}) \end{cases}$ | | |
| $L_5$ | $R_7 = +11.698$ | $t_5 = 2.5$ | $n_d = 1.61262\ V = 58.8$ |
| | $R_8 = -44.01$ | | |
| | | $s_3 = 1.45$ | |
| $L_6$ | $R_9 = -13.87$ | $t_6 = 1.0$ | $n_d = 1.617\ Va = 36.6$ |
| | $R_{10} = +11.00$ | | |
| | | $s_4 = 2.56$ | |
| $L_7$ | $R_{11} = +44.01$ | $t_7$ | $n_d = 1.61262\ V = 58.8$ |
| | $R_{12} = -11.698$ | | |
| | $s_5 = \begin{cases} 70.1\ (\text{Low Power}) \\ 84.9\ (\text{Median Power}) \\ 99.7\ (\text{High Power}) \end{cases}$ | | |
| $L_8$ | $R_{13} = +129.0$ | $t_8 = 2.0$ | $n_d = 1.617\ V = 36.6$ |

-continued

| | | | |
|---|---|---|---|
| L₉ | R₁₄ = + 35.5 | t₉ = 9.25 | n_d = 1.517 V = 64.5 |
| | R₁₅ = − 53.2 | s₈ = 1.78 | |
| L₁₀ | R₁₆ = + 62.4 | t₁₀ = 8.75 | n_d = 1.517 V = 64.5 |
| L₁₁ | R₁₇ = − 35.5 | t₁₁ = 2.0 | n_d = 1.617 V = 36.6 |
| | R₁₈ = − 129.0 | | |

* * * * *

UNITED STATES PATENT OFFICE
CERTIFICATE OF CORRECTION

Patent No. 3,918,791　　　　　Dated　November 11, 1975

Inventor(s)　　DONALD M. PERRY

It is certified that error appears in the above-identified patent and that said Letters Patent are hereby corrected as shown below:

Col. 2, line 45, change "yield" to --field--

Col. 4, claim 10, line 24, delete "200"

Col. 4, claim 10, line 32, after "1.617" change "Va" to --V--

Col. 5, claim 10, last line, after "$t_{10}=$" insert --8.75--

Col. 6, claim 10, first line, delete "8.75"

Col. 6, claim 10, line 3, after "$t_{11}=$" insert --2.0--

Col. 6, claim 10, line 4, delete "2.0"

*Signed and Sealed this*

*tenth* Day of *February 1976*

[SEAL]

Attest:

RUTH C. MASON
*Attesting Officer*

C. MARSHALL DANN
*Commissioner of Patents and Trademarks*